United States Patent Office 2,751,316
Patented June 19, 1956

2,751,316

COATED FILM

Herman G. Philips, Jr., Wilmington, Del., assignor to Hercules Powder Company, Wilmington, Del., a corporation of Delaware No Drawing. Application March 30, 1955,
Serial No. 498,094

12 Claims. (Cl. 117—138.8)

This invention relates to novel and improved coated films. In a specific aspect, this invention relates to polyethylene terephthalate films coated with a decorative or ink coating. In another specific aspect, this invention relates to polyvinylidene chloride films coated with a decorative or ink coating.

In recent years the film and packaging industries, as well as other related industries, have found a relatively wide usage for films and packaging materials made from polyethylene terephthalate and polyvinylidene chloride. The latter film may be employed itself or it may be deposited on a substrate such as regenerated cellulose. In spite of the wide usage of these films, the packaging industry has been confronted with the perplexing problem of providing these films with decorative or ink coatings. Such coatings must of necessity be highly flexible in addition to possessing good adhesive properties. Otherwise, the decorative or ink coatings would be of little value in the packing field. A number of film-forming materials have been tried prior to this invention as decorative or ink coatings in an effort to solve this problem. Among the film-forming materials that have been tried are nitrocellulose, chlorinated rubber, ethyl cellulose, and the like, in admixture with a variety of resinous and plasticizing materials. However, these compositions usually have not had the necessary properties for a good decorative or ink coating.

In accordance with this invention it has been found that polyethylene terephthalate or polyvinylidene chloride films can be effectively coated with a decorative or ink coating containing nitrocellulose and a resinous plasticizing hydroabietyl derivative of the group consisting of hydroabietyl alcohol, dihydroabietyl phthalate, and mixtures thereof as essential ingredients of said coating in the ratio of 35 to 75% by weight of nitrocellulose to 65 to 25% by weight of said hydroabietyl derivative, the sum of the above percentages being substantially 100%. Preferably the nitrocellulose and resinous plasticizing hydroabietyl derivative components of the coating composition will constitute at least about 85% by weight of the unpigmented ingredients of said composition.

The following examples demonstrate the utility and operability of this invention.

EXAMPLE 1

A series of runs was made employing mixtures of RS Nitrocellulose, ½ second, Abitol and Synthetics B21 in the proportions by weight shown in the following table:

Table I

| Run | 1 | 2 | 3 | 4 | 5 | 6 | 7 | 8 | 9 | 10 |
|---|---|---|---|---|---|---|---|---|---|---|
| RS Nitrocellulose, ½ sec. | 50 | 40 | 60 | 50 | 70 | 70 | 60 | 60 | 50 | 40 |
| Abitol | 50 | 60 | 40 | | | 10 | 20 | | 20 | 10 | 10 |
| Synthetics B21 | | | | 50 | 20 | 10 | 40 | 20 | 40 | 50 |

These mixtures were employed in a 25% by weight solids solution in the following solvent mixture:

Parts by weight
Ethyl acetate _____ 30
Ethyl alcohol _____ 15
Butyl Cellosolve _____ 5
Toluene _____ 50

Each of the solutions contained 0.5% by weight based on total solids of a red dye to aid in evaluating the properties of the coating. The solutions were applied to a film of polyethylene terephthalate as a 3.0 mil wet film. The coated film was then force dried for 1.5 minutes in a forced draft oven at 180° C. The resulting coated film was then tested for adhesion and flexibility, and in each case it was found that the adhesion and flexibility of the coated film were excellent.

EXAMPLE 2

A series of runs was made in a manner similar to that described in Example 1. The coating compositions contained RS Nitrocellulose, ½ second, Abitol and Synthetics B21 in the following proportions by weight:

Table II

| Run | 11 | 12 | 13 | 14 | 15 | 16 | 17 | 18 |
|---|---|---|---|---|---|---|---|---|
| RS Nitrocellulose, ½ sec. | 70 | 70 | 70 | 60 | 60 | 50 | 50 | 50 |
| Abitol | | 20 | 30 | 30 | 40 | 10 | 40 | |
| Synthetics B21 | 30 | 10 | | 10 | | 40 | 10 | 50 |

The coating solution was applied to a substrate of a regenerated cellulose film coated with polyvinylidene chloride. The resulting coated film was tested in the same manner as in Example 1, and in each case it was found that the coated film had excellent adhesion and flexibility.

EXAMPLE 3

A coating composition containing 60% RS Nitrocellulose, ½ second, 35% Abitol and 5% dioctyl phthalate by weight was applied to a polyethylene terephthalate film in a manner similar to that described in Example 1. Adhesion of the coating to the film was excellent.

The Abitol employed in the above examples is a product of Hercules Powder Company known as hydroabietyl alcohol. It is a mixture of dehydroabietyl alcohol, dihydroabietyl alcohol and tetrahydroabietyl alcohol. The Synthetics B21 employed in the above examples is also a product of Hercules Powder Company and it is a dihydroabietyl phthalate.

In the above examples the adhesion of the coating to the film was determined by the "Scotch tape" test and the "fingernail scratch" test. In the "Scotch tape" test a 1½ inch length of one-inch Scotch tape is applied to the coated film and then rapidly removed from the surface of the coating. The adhesion is determined by the manner in which the Scotch tape affects the coating on the film. If the tape has no effect upon the coating, the adhesion is rated as excellent. If the tape removes only a portion of the coating, the adhesion is rated as fair, and if the tape effects a complete removal of the coating, the adhesion is rated as poor. For the "fingernail scratch" test, a section of the coated film is cross-hatched with a razor blade, and the adhesion is then rated by the ease of removal of the cross-hatched coating from the substrate with a fingernail. For example, if the coating is difficult to remove, the adhesion is rated as excellent, and, if the coating is easy to remove, the adhesion is rated as poor. In the above examples, the flexibility of the coated film was determined by bending the coated film 180° and then creasing the coated film on the fold. Films that showed no failure at the crease were rated as having excellent flexibility.

The nitrocellulose that is used to form the coatings for this invention may be in the form of any of the soluble forms of nitrocellulose that are available commercially. In general, the nitrocellulose will contain from about 10.7 to about 12.2% nitrogen and it will have a viscosity not lower than about ¼ second and usually not higher than about 20 seconds. The preferred nitrocellulose should have a viscosity not greater than about six seconds, and the most preferred has a viscosity of about ½ second. The viscosity of the nitrocellulose is determined by the standard viscosity method which consists of dissolving 12.2% of the dry nitrocellulose in a solvent composed of 25% ethyl alcohol, 20% ethyl acetate and 50% toluene. A glass tube 14 inches long with a 1-inch internal diameter is filled with the solution. A steel ball 5/16 inch in diameter is then dropped through the solution maintained at a temperature of 25° C., and the time in seconds for the ball to fall through 10 inches of the solution is recorded as the viscosity.

The coating compositions of this invention contain nitrocellulose and a resinous hydroabietyl derivative as essential ingredients. These two essential ingredients constitute at least 85% by weight of the unpigmented nonvolatile ingredients of the composition, and are employed in the ratio of 35 to 75% by weight of nitrocellulose to 65 to 25% by weight of the hydroabietyl derivative, the sum of the above percentages for nitrocellulose and hydroabietyl derivative being substantially 100%. For coating polyvinylidene chloride substrates, it is preferred to employ a ratio of at least 42% nitrocellulose to 58% hydroabietyl derivative by weight. The resinous hydroabietyl derivative can be either hydroabietyl alcohol alone, dihydroabietyl phthalate alone, or mixtures of the two in various proportions.

Based on the combined weight of nitrocellulose and resinous plasticizing hydroabietyl derivative, preferred compositions for coating polyethylene terephthalate substrate contain from 35 to 75% by weight of nitrocellulose, from 0 to 62% by weight of dihydroabietyl phthalate, and from 0 to 34% by weight of hydroabietyl alcohol. On the same basis, preferred compositions for coating polyvinylidene chloride substrate contain from 42 to 75% by weight of nitrocellulose, from 0 to 32% by weight of dihydroabietyl phthalate, and from 0 to 48% by weight of hydroabietyl alcohol. It will be understood from the above ranges for the essential components of the coating composition that the various components will be selected and mixed in such a manner that the sum of the percentages of the essential ingredients in the coating composition will be substantially 100%.

In accordance with this invention, up to about 15% by weight of the unpigmented nonvolatile ingredients of the coating compositions can be a substantially nonvolatile phthalate plasticizer such as dioctyl phthalate, dicyclohexyl phthalate, diphenyl phthalate, and the like.

The above components for the coating composition can be applied to the substrate by dissolving the various components in a suitable solvent solution. The specific examples above set forth a particular solvent solution that can be employed. However, other solvent solutions can be used such as mixtures containing ketones, esters and ethers, for example, acetone, methyl isobutyl ketone, ethyl ether, Cellosolve, ethyl acetate, propyl acetate, butyl acetate, and the like, can be employed. The aliphatic alcohols such as ethanol, isopropanol, butanol, and the like are not true solvents but they can be used in combination with ester solvents to improve the solubility of the ester. Also, the solvent solution will normally contain a diluent or nonsolvent such as aromatic and aliphatic hydrocarbons. Among the diluents that can be used are hexane, various proprietary petroleum distillate thinners, benzene, xylene, toluene and the like.

The solution containing the solid coating materials is applied to the substrate by any suitable means such as by spraying, roller coating, doctor blade, or similar means, after which solvent is evaporated from the coating composition. Air-drying for 24 hours develops the necessary adhesion and flexibility of the coating composition to the substrate. It is more convenient and practical, however, to force dry at an elevated temperature, for satisfactory coating properties such as adhesion and flexibility can be achieved within a few minutes. For example, coated films force dried for 1.5 minutes at 180° C. have excellent adhesion and flexibility.

Decorative and ink coatings in accordance with this invention will usually contain a suitable coloring material, such as a dye or pigment or a mixture of dye and pigment. In order to maintain adhesion of the coating at a high level, excessive pigmentation should be avoided. Proper pigmentation with black pigment will ordinarily be within the range from about 2–10% by weight, based on total nonvolatile ingredients in the coating composition, while pigmentation with a white pigment will ordinarily be within the range from about 10–20% by weight on the same basis. Pigmentation with other pigments such as blues, greens, yellows and reds will ordinarily fall within a range between black and white pigments. Dyes employed alone or in conjunction with a pigment are ordinarily used in small quantities, usually on the order of 1% or less by weight based on total nonvolatile ingredients in the coating composition.

What I claim and desire to protect by Letters Patent is:

1. A coated film comprising in combination a substrate of the group consisting of polyethylene terephthalate and polyvinylidene chloride and as a coating therefor a composition containing, as essential ingredients, nitrocellulose and a resinous plasticizing hydroabietyl derivative of the group consisting of hydroabietyl alcohol, dihydroabietyl phthalate and mixtures thereof in the ratio of 35 to 75% by weight of nitrocellulose to 65 to 25% by weight of said hydroabietyl derivative, the sum of the aforestated percentages being substantially 100%, said nitrocellulose and hydroabietyl derivative constituting at least about 85% by weight of the unpigmented ingredients of said composition.

2. A coated film comprising in combination a polyethylene terephthalate substrate and as a coating therefor a composition containing, as essential ingredients, nitrocellulose and a resinous plasticizing hydroabietyl derivative of the group consisting of hydroabietyl alcohol, dihydroabietyl phthalate, and mixtures thereof in the ratio of 35 to 75% by weight of nitrocellulose to 65 to 25% by weight of said hydroabietyl derivative, the sum of the aforestated percentages being substantially 100%, said nitrocellulose and hydroabietyl derivative constituting at least about 85% by weight of the unpigmented ingredients of said composition.

3. A coated film comprising in combination a polyethylene terephthalate substrate and as a coating therefor a composition containing, as essential ingredients, nitrocellulose and hydroabietyl alcohol in the ratio of 35 to 75% by weight of nitrocellulose to 65 to 25% by weight of hydroabietyl alcohol, the sum of the aforestated percentages being substantially 100%, said nitrocellulose and hydroabietyl alcohol constituting at least about 85% by weight of the unpigmented ingredients of said composition.

4. A coated film comprising in combination a polyethylene terephthalate substrate and as a coating therefor a composition containing, as essential ingredients, nitrocellulose and dihydroabietyl phthalate in the ratio of 35 to 75% by weight of nitrocellulose to 65 to 25% by weight of dihydroabietyl phthalate, the sum of the aforestated percentages being substantially 100%, said nitrocellulose and dihydroabietyl phthalate constituting at least about 85% by weight of the unpigmented ingredients of said composition.

5. A coated film comprising in combination a polyethylene terephthalate substrate and as a coating therefor a composition containing, as essential ingredients, nitrocellulose and a mixture of hydroabietyl alcohol and dihydroabietyl phthalate in the ratio of 35 to 75% by weight of nitrocellulose and 65 to 25% by weight of said mixture of hydroabietyl alcohol and dihydroabietyl phthalate, the sum of the aforestated percentages being substantially 100%, said nitrocellulose and said mixture of hydroabietyl alcohol and dihydroabietyl phthalate constituting at least about 85% of the unpigmented ingredients of said composition.

6. A coated film comprising in combination a polyvinylidene chloride substrate and as a coating therefor a composition containing, as essential ingredients, nitrocellulose and a resinous plasticizing hydroabietyl derivative of the group consisting of hydroabietyl alcohol, dihydroabietyl phthalate, and mixtures thereof in the ratio of 42 to 75% by weight of nitrocellulose to 58 to 25% by weight of said hydroabietyl derivative, the sum of the aforestated percentages being substantially 100%, said nitrocellulose and hydroabietyl derivative constituting at least about 85% by weight of the unpigmented ingredients of said composition.

7. A coated film comprising in combination a polyvinylidene chloride substrate and as a coating therefor a composition containing, as essential ingredients, nitrocellulose and hydroabietyl alcohol in the ratio of 42 to 75% by weight of nitrocellulose to 58 to 25% by weight of hydroabietyl alcohol, the sum of the aforestated percentages being substantially 100%, said nitrocellulose and hydroabietyl alcohol constituting at least about 85% by weight of the unpigmented ingredients of said composition.

8. A coated film comprising in combination a polyvinylidene chloride substrate and as a coating therefor a composition containing, as essential ingredients, nitrocellulose and dihydroabietyl phthalate in the ratio of 42 to 75% by weight of nitrocellulose to 58 to 25% by weight of dihydroabietyl phthalate, the sum of the aforestated percentages being substantially 100%, said nitrocellulose and dihydroabietyl phthalate constituting at least about 85% by weight of the unpigmented ingredients of said composition.

9. A coated film comprising in combination a polyvinylidene chloride substrate and as a coating therefor a composition containing as essential ingredients, nitrocellulose and a mixture of hydroabietyl alcohol and dihydroabietyl phthalate in the ratio of 42 to 75% by weight of nitrocellulose to 58 to 25% by weight of said mixture of hydroabietyl alcohol and dihydroabietyl phthalate, the sum of the aforestated percentages being substantially 100%, said nitrocellulose and said mixture of hydroabietyl alcohol and dihydroabietyl phthalate constituting at least about 85% by weight of the unpigmented ingredients of said composition.

10. A coated film comprising in combination a polyethylene terephthalate substrate and as a coating therefor a composition containing, as the unpigmented ingredients of said composition, about 60% by weight of nitrocellulose, 35% by weight of hydroabietyl alcohol, and 5% by weight of dioctyl phthalate.

11. A coated film comprising in combination a polyethylene terephthalate substrate and as a coating therefor a composition containing, as essential ingredients, from 35 to 75% by weight of nitrocellulose, from 0 to 62% by weight of dihydroabietyl phthalate and from 0 to 34% by weight of hydroabietyl alcohol, the proportions of said nitrocellulose, dihydroabietyl phthalate and hydroabietyl alcohol being selected within the above ranges to total substantially 100%, said nitrocellulose, dihydroabietyl phthalate and hydroabietyl alcohol constituting at least about 85% by weight of the unpigmented ingredients in said composition.

12. A coated film comprising in combination a polyvinylidene chloride substrate and as a coating therefor a composition containing, as essential ingredients, from 42 to 75% by weight of nitrocellulose, from 0 to 32% by weight of dihydroabietyl phthalate, and from 0 to 48% by weight of hydroabietyl alcohol, the proportions of said nitrocellulose, dihydroabietyl phthalate and hydroabietyl alcohol being selected within the above ranges to total substantially 100%, said nitrocellulose, dihydroabietyl phthalate and hydroabietyl alcohol constituting at least about 85% by weight of the unpigmented ingredients in said composition.

No references cited.